2,790,796

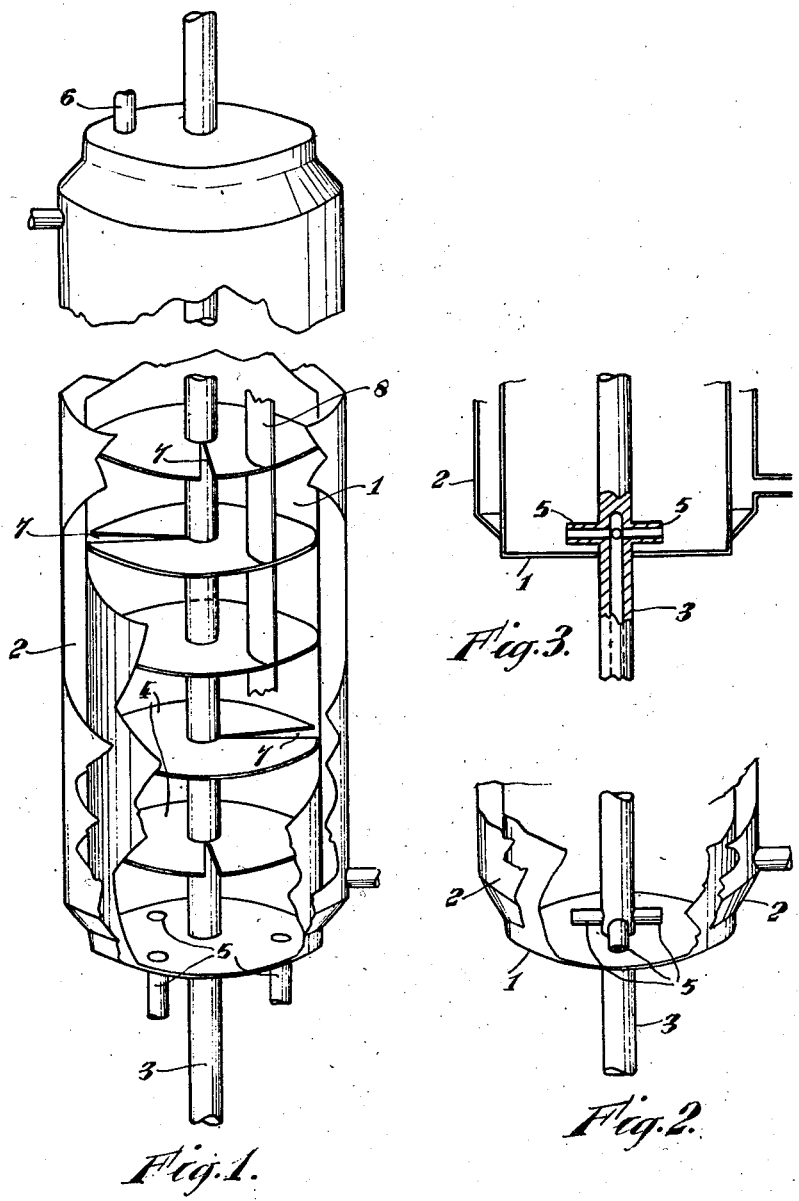

CONTINUOUS PROCESS AND APPARATUS FOR THE HYDROLYSIS OF ESTERS IN HOMOGENEOUS PHASE AND ANALOGOUS REACTIONS

Jean Robin, Roussillon, and Roland Clévy, Le Peage-de-Roussillon, France, assignors to Societe "Rhodiaceta," Paris, France, a body corporate of France Application March 9, 1953, Serial No. 341,239

Claims priority, application France October 31, 1952

5 Claims. (Cl. 260—230)

It is known that industrial processes for the manufacture of secondary cellulose acetate soluble in acetone comprise a first stage in which cellulose is completely acetylated to the triacetate, and a second stage which consists in hydrolysing the triacetate, which is insoluble in acetone, to eliminate some of the acetylated groups. It is known that the acetylation may be carried out in homogeneous phase, i. e. in a solvent medium for the triacetate which is formed, or in heterogeneous phase, i. e. in a medium such that the fibrous structure of the cellulose is conserved during the reaction. The hydrolysis may also be carried out in homogenous or heterogeneous phase, irrespective of whether the triacetate itself was obtained in homogeneous or heterogeneous phase.

When the hydrolysis in homogeneous phase is carried out using a non-continuous process the operation does not present any special difficulties but this is no longer so when it is desired to carry out the hydrolysis in homogeneous phase using a continuous process. Cellulose acetate which is obtained in homogeneous phase using a continuous process has much more irregular analytical properties, particularly as regards titre, viscosity and filtrability, than those of cellulose acetate obtained by the hydrolysis in homogeneous phase using a discontinuous process.

It is an object of the invention to provide a continuous process whereby it is possible to obtain by hydrolysis in homogeneous phase cellulose acetate which is soluble in acetone and has extremely uniform properties, e. g. titre, viscosity and filtrability.

It is another object of the invention to provide an apparatus in which cellulose acetate soluble in acetone and having extremely uniform properties, e. g. titre, viscosity and filtrability, may be produced by the continuous hydrolysis in homogeneous phase of cellulose triacetate.

It is a further object of the invention to provide an apparatus for obtaining a substantially even reaction throughout a reaction mixture when carrying out reactions analogous to the continuous hydrolysis in homogeneous phase of cellulose triacetate. Other objects of the invention will become apparent hereinafter.

According to the invention, a process for the hydrolysis in homogeneous phase of cellulose triacetate comprises mixing a hydrolysis agent with a solution of said acetate, leading the resulting mixture through a reactor constituted by at least one cylindrical container, a rotatable shaft passing through the axis of said container, circular platforms mounted on said shaft at substantially right angles to form compartments with said container, each of said platforms having at least one opening in an offset relation from one platform to the next, regulating the average time of passage of said mixture through said reactors to a time of from 3 to 10 hours and maintaining the temperature of said mixture in said reactor at from 40° to 80° C.

This process is applicable for any hydrolysis agent and catalyst employed.

Preferably the hydrolysis agent is added to the triacetate solution and the mixture obtained in this way is then introduced into the reactor, but it is also possible to lead the hydrolysis agent and the triacetate solution into the reactor separately.

It has been found that particularly favourable results are obtained when the viscosity of the solution to be hydrolysed is between 20 and 80 c. g. s. units, preferably between 30 and 70 c. g. s. units. Any known means may be used to bring the viscosity within these limits, for example the temperature of the solution may be modified, its dilution or the nature of the solvent employed. A preferred method of carrying out the process of the invention comprises adding the hydrolysis agent in two stages to the triacetate solution. In the first stage one part, e. g. 70–90%, of the hydrolysis agent at ordinary temperature or below is added to this solution. In the second stage the remainder of the hydrolysis agent, which has been heated, and may even be vaporized, is injected into the mixture resulting from the first stage.

In accordance with the invention also, an apparatus for obtaining a substantially even reaction throughout a reaction mixture comprises at least one cylindrical container, a rotatable shaft passing through the axis of said container, circular platforms mounted on said shaft at substantially right angles to form compartments with said container, each of said platforms having at least one opening in an offset relation from one platform to the next.

By way of example, one embodiment of the apparatus in accordance with the invention comprising one container only will now be described with reference to the accompanying diagrammatic drawings in which Fig. 1 represents a front elevation of the apparatus with part of its wall removed, Fig. 2 shows a modified form of the inlet tubes of the apparatus, and Fig. 3 represents a vertical cross section through the portion of the apparatus shown in Figure 2.

As may be seen in Figure 1 the embodiment of the apparatus comprises a vertical cylindrical container 1 surrounded by a jacket 2 for regulating the temperature. A rotatable shaft 3 passes through the container 1 and the shaft 3 may be rotated by any suitable means (not shown). Platforms 4 are mounted at right angles to the axis of the shaft 3 and the platforms 4 may be rotated with the shaft. The platforms 4 have a diameter substantially equal to the interior diameter of the container 1. The container 1 comprises near each of its extremities tubes 5 and 6 for the entrance of reactants and exit of reaction mixture respectively. Depending on the diameter of the container 1 the reaction mixture may enter the container 1 by one or more tubes disposed, for example, at the lower end of the container 1 as shown in Figure 1. The entrance tubes 5 may also be situated in the interior of the shaft 3 which shaft will in this case be hollow as indicated in Figures 2 and 3.

The diameter of the platforms 4 is substantially equal to the interior diameter of the container 1 so that the reaction mixture practically cannot run out between the edge of the platforms 4 and the inner surface of the container 1. In order to permit the circulation of the reaction mixture in the interior of the container 1 each platform 4 has an opening in the shape of a sector 7, each sector being in an offset relation of 90° from one platform to the next. The area of the sector 7 in each platform 4 is such that the time of passage of the reaction mixture through the container 1 is controlled, avoiding at the same time substantial charge losses which would have the tendency to produce leaks between the edge of the platforms 4 and the interior surface of the container 1.

Scraper blades 8 are provided in order to lead back towards the centre those portions of the reaction mixture which may have the tendency to remain near the inner surface of the container 1.

In certain cases it is possible to use one single container but more often it is better to employ a series of containers through which the reaction mixture passes successively and where the various stages of the reaction may take place. In particular, good results have been obtained by using a series of from 3 to 10 containers.

The opening in the platforms may be of any other desired shape than a sector and there may be more than one opening in each platform; the offset relation between openings from one platform to the next need not be 90°.

The dimensions of the container or containers of the apparatus according to the invention depend on the nature of the product to be treated, from the nature of the product desired, from the number of containers employed, etc. However, it may be stated that specially favourable results are obtained, when cellulose triacetate is hydrolysed continuously, by using containers whose height is from 1 to 6 metres, the ratio of the height of the container to its diameter being from 1.5 to 5.0, and 6–14 platforms per metre length of the container, the platforms being equidistant from one another.

The ratio of the surface of the opening or openings of the platforms to the surface of the platforms will vary according to the nature of the reaction mixture and the speed of rotation of the shaft on which the platforms are mounted. However, it may be stated that very good results have been obtained in the case of the hydrolysis of cellulose triacetate with a ratio of from $1/40$ to $1/80$.

The reaction mixture may move in the interior of the container 1 either from bottom to top or from top to bottom without departing from the inventive idea.

For a better understanding of the invention the following non-limitative example of hydrolysing cellulose triacetate in the apparatus described above is given.

A solution of cellulose triacetate in acetic acid is led continuously into a mixer at a rate of 120 litres per hour and 42 litres per hour of a mixture consisting of

| | Parts by weight |
|---|---|
| Acetic acid | 60 |
| Water | 40 |
| Sodium acetate | 1 | is introduced into the mixer, said mixture being at a temperature of 15° C. 6 to 7 litres of a vaporized similar mixture but without the sodium acetate is then continuously injected into the resulting solution. The temperature of the whole solution is thus brought to 75° C. and its viscosity is then between 30 and 70 c. g. s. units. The solution is then led through apparatus according to the invention comprising three containers connected in series, the solution circulating from the bottom to the top. Each container has a height of 1.10 m. and a diameter of 0.45 m. and is furnished with platforms spaced from one another by 0.10 m. and mounted on a rotatable shaft. Each platform comprises an opening in the form of a sector having a central angle of 6°. The offset of the openings from one platform to the next is 90°.

The speed of rotation of the shaft carrying the platforms is regulated at 15 revolutions per hour.

During the hydrolysis the temperature of the solution is kept at 75° C. by the circulation of hot water in the jacket surrounding each container. At the exit from the last container the hydrolysed solution is precipitated by known means and in this way cellulose acetate is obtained having an acetic acid titre between 54 and 55% and having very homogeneous properties.

The apparatus of the present invention enables particularly favourable results of continuous hydrolysis of cellulose triacetate to be obtained, but it can also be used for the hydrolysis of other esters or mixed carboxylic esters of cellulose such as for example the butyrate, the propionate, the acetobutyrate and the acetopropionate of cellulose. The apparatus may also be used for any other analogous reaction which it is desired to carry out as a continuous process, for example the saponification of vinyl acetate, the acetalisation of polyvinyl alcohol, the treatment with strong acid of residuary acetic acid from the manufacture of cellulose acetate in order to degrade and solubilize in water the cellulose products dissolved in this residuary acid, etc.

Although the present invention has been described with particular reference to specific details, it is not intended that such details shall be regarded as limitations upon the scope of the invention except insofar as included in the accompanying claims.

What we claim and desire to secure by Letters Patent is:

1. A process for continuously hydrolyzing cellulose triacetate in homogeneous phase which comprises mixing a hydrolysis agent with a solution of said acetate, bringing the viscosity of the resulting mixture to a value of from 20–80 c. g. s. units, the amount of hydrolysis agent being sufficient to effect hydrolysis to the desired extent, continuously leading said mixture through a subdivided reaction zone at a substantially uniform temperature, passing said mixture from one subdivision of the reaction zone to the next, regulating the average time of passage of said mixture through said reaction zone to a time of from 3 to 10 hours and maintaining the temperature of said mixture in said reaction zone at from 40° C. to 80° C.

2. A process for continuously hydrolysing cellulose triacetate in homogeneous phase which comprises mixing with a solution of said acetate a portion of a hydrolysis agent which is at a temperature not greater than 30° C., thereupon adding the remainder of the hydrolysis agent to the resulting mass, said remainder of the hydrolysis agent being at a higher temperature than the first portion of the hydrolysis agent so as to bring the viscosity of the resulting mixture to a value of from 20 to 80 c. g. s. units, the amount of hydrolysis agent being sufficient to effect hydrolysis to the desired extent, continuously leading the resulting mixture through a subdivided reaction zone at a substantially uniform temperature, passing said mixture from one subdivision of the reaction zone to the next, regulating the average time of passage of said mixture through said reaction zone to a time of from 3 to 10 hours and maintaining the temperature of said mixture in said reaction zone at from 40° C. to 80° C.

3. A process for continuously hydrolysing cellulose triacetate in homogeneous phase which comprises mixing with a solution of said acetate a portion of a hydrolysis agent which is at a temperature not greater than 30° C., thereupon adding the remainder of the hydrolysis agent in the vapor phase to the resulting mass so as to bring the viscosity of the resulting mixture to a value of from 20 to 80 c. g. s. units, the amount of hydrolysis agent being sufficient to effect hydrolysis to the desired extent, continuously leading the resulting mixture through a subdivided reaction zone at a substantially uniform temperature, passing said mixture from one subdivision of the reaction zone to the next, regulating the average time of passage of said mixture through said reaction zone to a time of from 3 to 10 hours and maintaining the temperature of said mixture in said reaction zone at from 40° C. to 80° C.

4. An apparatus for the continuous hydrolysis of cellulose triacetate which comprises at least one vertical cylindrical container, a rotatable shaft passing through the axis of the container, circular platforms mounted on said shaft at substantially right angles and having a running fit with the container walls to form separate fluid compartments within said container, each of said platforms having at least one opening of a size such that the open area is from $1/40$ to $1/80$ of the surface of each platform, all of the openings in said platform being located in a limited sector, said sector being in offset relation from one platform to the next to cause the liquid to follow a circuitous path from one compartment to the next in flowing through said container.

5. An apparatus as set forth in claim 4 in which said sectors in successive platforms are displaced by an angle of about 90°.

References Cited in the file of this patent

UNITED STATES PATENTS

| | | |
|---|---|---|
| 1,949,213 | Mason | Feb. 27, 1934 |
| 2,156,236 | Bonotto | Apr. 25, 1939 |
| 2,397,488 | Houghland et al. | Apr. 2, 1946 |
| 2,432,153 | Haney et al. | Dec. 9, 1947 |
| 2,560,391 | Kleinhert | July 10, 1951 |
| 2,582,317 | Donohue | Jan. 15, 1952 |